US008838610B2

(12) United States Patent
Swartz

(10) Patent No.: US 8,838,610 B2
(45) Date of Patent: Sep. 16, 2014

(54) LISTING TUNE-UP SYSTEM

(75) Inventor: Jason Adam Swartz, Oakland, CA (US)

(73) Assignee: eBay Inc., San Jose, CA (US)

( * ) Notice: Subject to any disclaimer, the term of this patent is extended or adjusted under 35 U.S.C. 154(b) by 492 days.

(21) Appl. No.: 12/609,905

(22) Filed: Oct. 30, 2009

(65) Prior Publication Data
US 2011/0106851 A1 May 5, 2011

(51) Int. Cl.
*G06F 17/30* (2006.01)
*G06Q 30/06* (2012.01)

(52) U.S. Cl.
CPC .......... *G06Q 30/0603* (2013.01); *G06F 17/30* (2013.01)
USPC .......................................... 707/748; 707/749

(58) Field of Classification Search
None
See application file for complete search history.

(56) References Cited

U.S. PATENT DOCUMENTS

| 7,526,722 | B2 * | 4/2009 | Wadhwa ....................... 715/707 |
| 7,672,877 | B1 * | 3/2010 | Acton et al. ................. 705/26.1 |
| 7,788,160 | B2 * | 8/2010 | Srinivasamurthy et al. .... 705/37 |
| 2007/0150365 | A1 * | 6/2007 | Bolivar ......................... 705/26 |

* cited by examiner

*Primary Examiner* — Christyann Pulliam
*Assistant Examiner* — Charles Adams
(74) *Attorney, Agent, or Firm* — Schwegman, Lundberg & Woessner, P.A.

(57) ABSTRACT

A listing tune-up system is provided. An example listing tune-up system may include a detecting module to detect a listing for an item. The listing may comprise various information including a title, and a category of the item for transaction. The example listing tune-up system may include a determining module to determine a recommended category set for the item using categories of existing listings that match one or more keywords in the title. The example listing tune-up system may include a verifying module to verify whether the category of the item complies with the recommended category set. The example listing tune-up system may further include a generating module to generate a tune-up report for the listing upon completion of the verification. The tune-up report may comprise the recommended category set and/or other editing suggestions.

19 Claims, 4 Drawing Sheets

LISTING TUNE-UP SYSTEM

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be described below and in the drawings that form a part of this document: Copyright © 2009, eBay Inc. All Rights Reserved.

TECHNICAL FIELD

This application relates to the technical fields of software and/or hardware technology and, in one example embodiment, to an online listing system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Under a current on-line transaction processing system (e.g., eBAY, Amazon, or Rent.com, etc.), an electronic listing (hereinafter "listing") may be used to describe an offering of an item or service provided by a user (e.g., seller) for transaction. The listing may be composed by the user via a user interface to include keywords that describe the item or service and then it may be submitted to the on-line transaction processing system. The on-line transaction processing system may then provide the listing to other users (e.g., buyers) when it determines that the keywords included in the listing match a query provided by the other users. The on-line transaction processing system may use a dedicated search engine for the purpose of determining the match between the keywords in the listing and the query.

BRIEF DESCRIPTION OF DRAWINGS

Embodiments of the present invention are illustrated by way of example and not limitation in the FIGs. of the accompanying drawings, in which like reference numbers indicate similar elements and in which.

DETAILED DESCRIPTION

Figure 1:
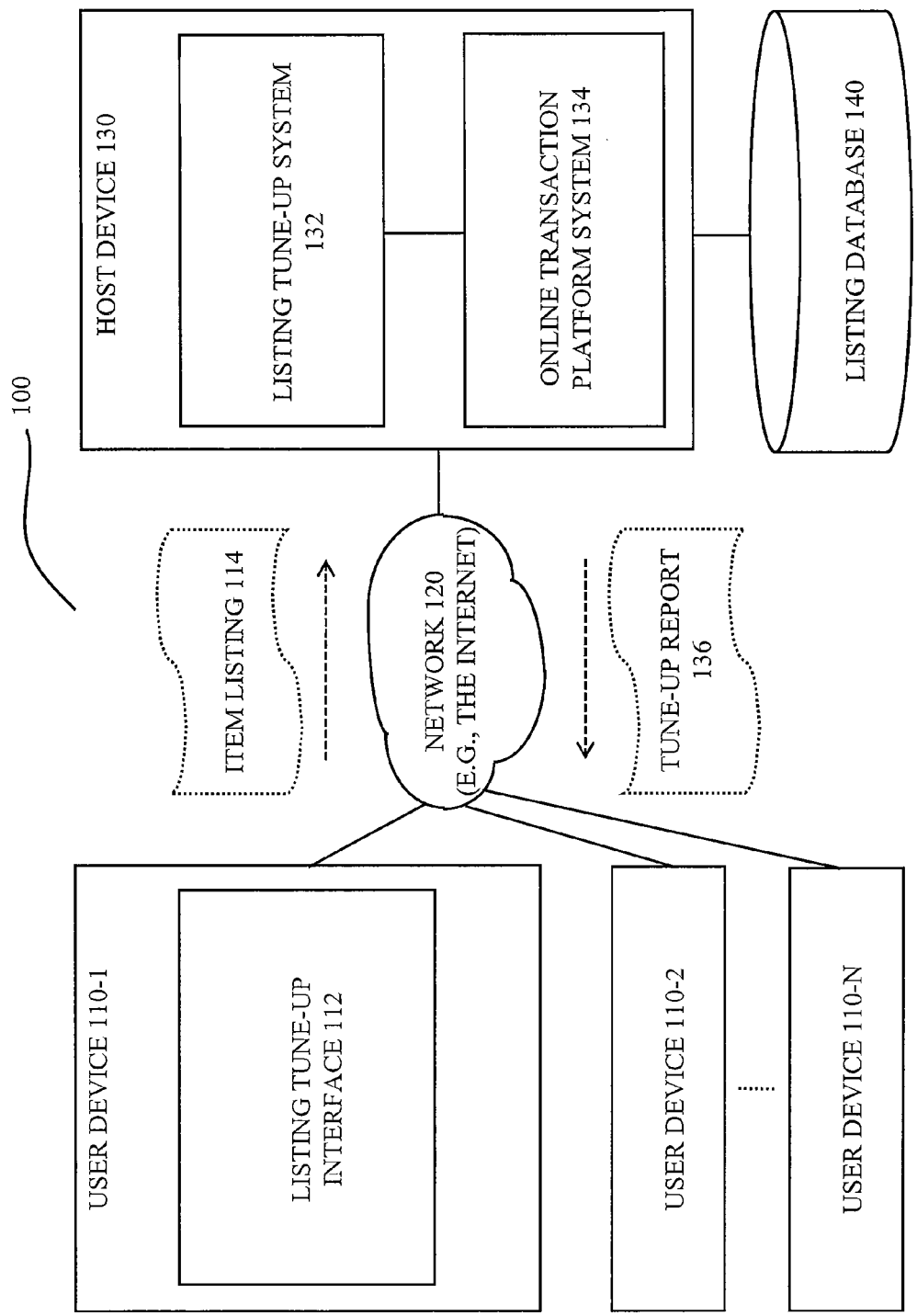
FIG. 1 is a diagrammatic representation of an architecture within which one example embodiment of a listing tune-up system may be implemented.

In the following description, for purposes of explanation, numerous specific details are set forth in order to provide a thorough understanding of an embodiment of the present invention. It will be evident, however, to one skilled in the art that the present invention may be practiced without these specific details.

An online listing system (e.g., online transaction platform system 134 of FIG. 1) in which goods/services are offered to interested parties may accept a keyword query from a user and respond to the user with a number of matching item listings. The user may then review the returned item listings to select an item listing that best satisfies his requirements. To simplify the user's task of finding a desired item, an online listing system should ideally narrow a search scope by limiting the search to certain item listings that fall into the same category as one designated by the user before returning the item listings to the user.

Numerous techniques exist for allowing an online listing system narrow its search based on category information of the item listing. The existing techniques, however, did not address the fact that the category information designated by a user may be inappropriate for an item associated with a given item listing. Or, even if the category information designated by the user may be proper, there may be other categories that better fit the item according to statistical information from existing item listing in the online listing system. In other cases, the item listings are presented to potential buyers in an inefficient manner (e.g., lack of highlighting, frequent typos and grammatical errors, etc.). Such inappropriate, if not wrong, category information and/or inefficient presentation of an item listing results in the item listing receiving less attention and thus less feedback (e.g., viewing, bidding or buying) from other users (e.g., buyers). These problems occur since the current online listing system only passively accepts the user-provided information (e.g., category or editing suggestions, etc.) for a given item listing without giving consideration to statistical information extracted from relevant existing item listings for similar or identical items. These problems may be aggravated when the item listing is listed on the online listing system by a user with a low experience level. A new method and system is introduced to resolve these and other problems that may be inherently or explicitly disclosed by a further reading of this documentation.

Illustrated are a listing tune-up system and a method for operating the listing tune-up system in accordance with one example embodiment. An example listing tune-up system may include a detecting module to detect a listing for an item. The listing may comprise various information including a title, and a category of the item for transaction. The example listing tune-up system may include a determining module to determine a recommended category set for the item using categories of existing listings that match one or more keywords in the title. The example listing tune-up system may include a verifying module to verify whether the category of the item complies with the recommended category set. The example listing tune-up system may further include a generating module to generate a tune-up report for the listing upon completion of the verification. The tune-up report may comprise the recommended category set and/or other editing suggestions. More detailed explanation about the listing tune-up system and its operation is given below with reference to FIGS. 1-4.

FIG. 1 is a diagrammatic representation of an architecture 100 within which one example embodiment of a listing tune-up system may be implemented. As shown in FIG. 1, the architecture 100 may include one or more user devices 110-1, 110-2 and 110-N, in communication with a host device 130 via a network 120. Each of the user devices 110-1 through 110-N may comprise a stand-alone client computer system, a cell phone, or a personal digital assistant (PDA), etc. and run a listing tune-up interface 112. For example, the listing tune-up interface 112 running on the user device 110-1 may transfer an item listing 114 to the host device 130 via the network 120. The item listing 114 may comprise various types of data, for example, pictures or texts, etc., that describe an offer of an item for transaction. The item listing 114 may include a title and a category as examples of the text data. In one example embodiment, the item listing 114 may further include one or more subtitles and one or more subcategories for the item. The transaction may be an auction sale or a fixed-price sale.

The network 120 may provide a communication channel between the user devices 110-1 through 110-N and the host device 130. In one example embodiment, the network 120 may comprise a public network (e.g., the Internet, a wireless network, etc.) or a private network (e.g., a local area network (LAN), a wide area network (WAN), Intranet, etc.). The network 120 may use a transfer protocol, for example, Hypertext Transfer Protocol (HTTP), Hypertext Transfer Protocol Secure (HTTPs), or file transfer protocol (FTP), etc. to transfer the listing for the item 114 to the host device 130.

The host device 130 may receive the listing for the item 114 transferred from the user device 110-1 via the network 120. The host device 130 may comprise a listing tune-up system 132 and an online transaction platform system 134. In one example embodiment, the listing tune-up system 132 may detect a listing for an item (e.g., the item listing 114) listed on the host device 130, determine a recommended category set for the item using categories of existing listings that match one or more keywords in a title of the item, verify whether the category associated with the item complies with the recommended category set, and generate a tune-up report 136 that includes the recommended category set for the item. In one example embodiment, the listing tune-up system 132 may detect the listing for the item and/or the existing listings from a listing database 140, which may be operatively coupled to the host device 130 locally or remotely via a network (not shown in FIG. 1). The network via which the listing database 140 is coupled to the host device 130 may comprise the Internet, a LAN, a WAN, or a wireless network. In one example embodiment, the host device 130 may transfer the tune-up report 136 to the user device 110-1 from which the listing for the item (e.g., the item listing 114) is listed. More detailed structures and functions of the listing tune-up system 132 will be described below with reference to FIGS. 2 and 3.

In one example embodiment, the online transaction platform system 134 may provide the host device 130 with server-side functionality for a network-based marketplace (not shown in FIG. 1). For this purpose, the online transaction platform system 134 may run a number of modules or applications, such as a listing module, a search module or a billing module (not shown in FIG. 1). For example, the listing module may provide a user with capability to post an item listing for transaction via the user devices 110-1 through 110-N. The search module may provide access to existing listings associated with the host device 130 according to a user's query. The billing module may provide the host device 130 with capabilities to bill users according to various services provided to the users. It is noted that although only three modules are explained herein, the online transaction platform system 134 may run one or more other applications or modules. It is also noted that although the online transaction platform system 134 is described as an entity separate from the listing tune-up system 132, these two systems 132 and 134 may be combined as a single entity or divided into more entities, and yet provide the same functionality in some example embodiments.

Figure 2:
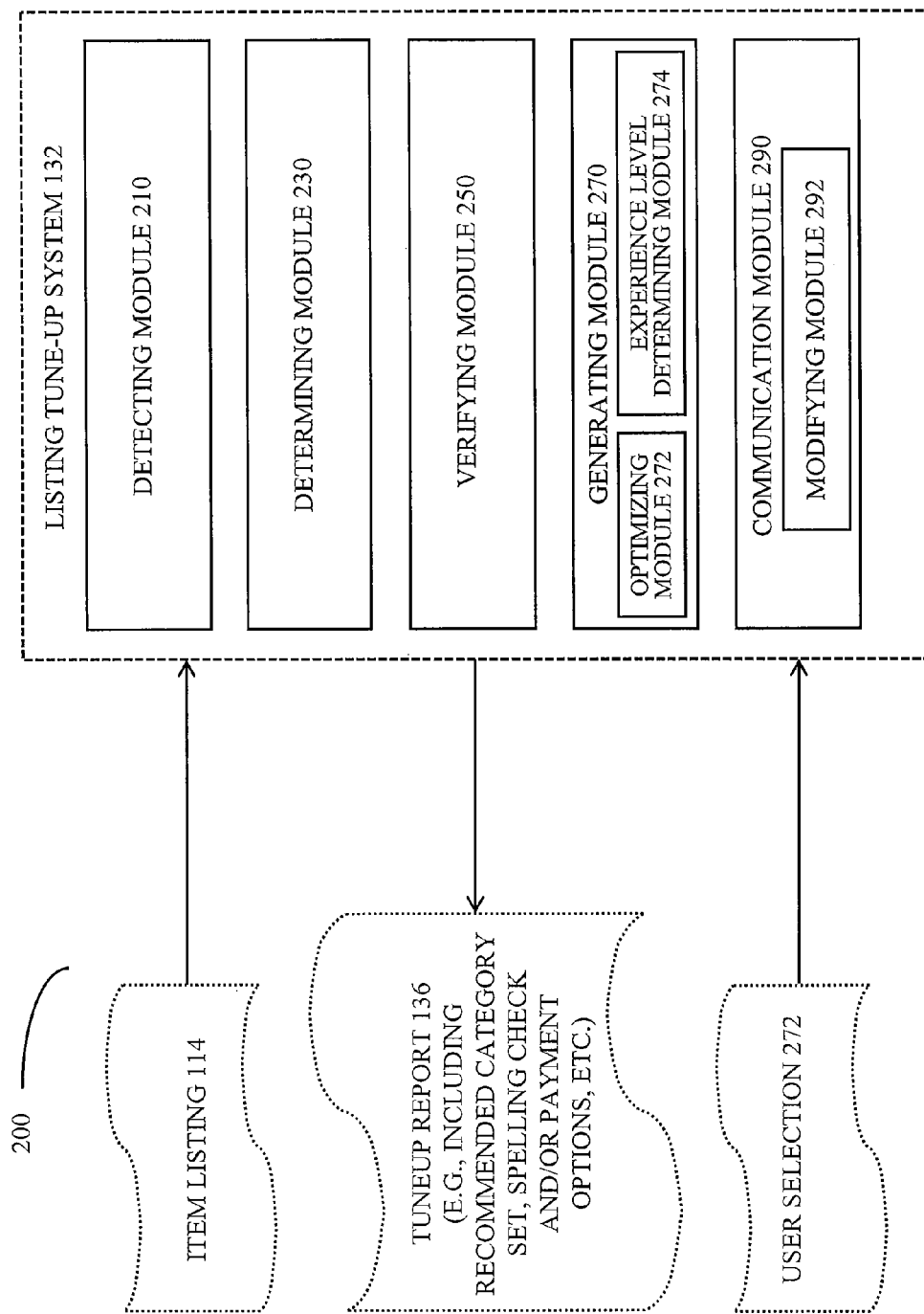
FIG. 2 is block diagram of a listing tune-up system, in accordance with one example embodiment.

FIG. 2 is block diagram 200 of the listing tune-up system 132, in accordance with one example embodiment. As shown in FIG. 2, the listing tune-up system 132 may comprise a detecting module 210, a determining module 230, a verifying module 250, a generating module 270, and a communication module 290. The detecting module 210 is configured to detect a listing for an item (e.g., item listing 114) which is listed by a user via a user device (e.g., the user device 110-1) associated with the user. The detecting module 210 may automatically detect the item listing 114 upon the item listing 114 being listed on the host device 130 (e.g., the online transaction platform system 134 as shown in FIG. 1). As noted earlier, the item listing 114 may include at least one title and at least one category of the item for transaction. In one example embodiment, the transaction may be different types of transaction, such as an auction, a fixed price sale or a combination thereof. In addition, the transaction may be a transaction that is not opened to users yet, a transaction that is opened to the user and currently active, or a transaction that is already closed.

In one example embodiment, the item listing may include date and time information when the item listing is configured to be published to users for transaction. In such a case, the detecting module 210 may detect the item listing 114 upon a specified triggering condition being met rather than upon being listed on the host device 130 (e.g., the online transaction platform system 134). For example, the triggering condition may be one week, one day, or one hour before publication to the users, or a specified date and time, such as Aug. 31, 2009, 2:00 PM, etc. It is noted that different conditions may be set as the triggering condition. In one example embodiment, the detecting module 210 may detect the item listing 114 according to a request from the user (e.g., seller) who listed the item listing to the host device 130. In such a case, the detecting module 210 may detect the item listing 114 from existing item listings whether or not the item listing 114 has been already published to the users for transaction, or even closed for the transaction. In one example embodiment, a minimum number of biddings within a given time frame may be set as the triggering condition for detecting item listings for tune-up. For example, if the minimum number of biddings on the item listing 114 for the first two days after publishing to the users is set to be five and the number of actual biddings on the item is less than five for the first two days, then the detecting module 114 may automatically detect the item listing 114 for an initial or additional tune-up of the item listing 114.

When the detecting module 210 detects the item listing 114, the determining module 230 may determine a recommended category set for the item associated with the item listing 114 by using category information of existing listings that match one or more keywords included in the title of the item listing 114. In one example embodiment, the detecting module 210 may calculate a usage frequency of a category of each existing listing that match the one or more keywords in the title of the item listing 114, relative to a total number of the existing listings. When the category information for the existing listings is calculated, the detecting module 210 may then sort the categories for the existing listings according to their corresponding usage frequencies. The detecting module 210 may then further designate a category with a highest usage frequency and a second highest usage frequency as a first recommended category and a second recommended category for the item, respectively. It is noted that the detecting module 210 may further designate more (e.g., a third or a fourth) recommended categories for the recommended category set for the item in a similar manner.

In one example embodiment, in order to calculate the usage frequency of each matching existing listing, the detecting module 210 may parse the title of the item listing 114 and extract the one or more keywords from the title of the item listing 114. The detecting module 210 may then compose a query based upon the one or more keywords extracted from the title of the item listing 114. The detecting module 210 may access a listing database (DB) that includes the existing item listings (e.g., listing database 140). The detecting module 210 may then retrieve from the listing DB the existing listings that meet the query, and extract the categories of the existing listings to calculate corresponding usage frequencies.

When the recommended category set for the items are determined, then the verifying module 250 may verify whether the category of the item included in the item listing 114 complies with the recommended category set. If the category of the item included in the item listing 114 is determined to comply with the recommended category set, then the verifying module 250 may send a notification of compliance (e.g., "a proper category") to an associated user device (e.g., the user device 110-1) from which the item listing 114 is listed. The verifying module 250 may then allow the item listing 114 to be viewed by users for an intended transaction, for example, by transferring a control to the online transaction platform system 134. If the category of the item included in the item listing 114 is determined not to comply with the recommended category set, then the verifying module 250 may send a notification of incompliance (e.g., "an inappropriate category") to the associated user device. At the same time or alternatively, the verifying module 250 may send a corresponding incompliance indication to the generating module 270.

The generating module 270 may generate a tune-up report 136 for the listing upon completion of the verification. The tune-up report 136 may include various recommendations for the item listing 114 such that the item listing can be published to users with more relevant and exact information for the intended transaction. The tune-up report 136 may comprise the recommended category set including the first and second recommended categories. In one example embodiment, the tune-up report 136 may further comprise editing suggestions (e.g., spelling, grammar, highlighting, such as a font, size or coloring, etc.) for any texts (e.g., title, category or description, etc.) included in the item listing 114. In one example embodiment, the tune-up report 136 may further comprise recommended payment options (e.g., PayPal or credit card, etc.) or a recommendation for a relevant picture for the intended transaction of the item.

In one example embodiment, the listing tune-up system 132 may further include an optimizing module 272 operatively coupled with the generating module 270. The optimizing module 272 may optimize the tune-up report 136 according to an attribute value indicating an experience level of a user. In one example embodiment, the listing tune-up system 132 may further include an experience level determining module 274 operatively coupled with the optimizing module 272. The experience level determining module 274 may automatically determine the experience level of the user based on a number of previous transactions by the user. Although the optimizing module 272 and the experience level determining module 274 are illustrated as being included in the generating module 270, either one or both of the modules may be implemented as separate modules of the listing tune-up system 132. The use of the experience level of the user allows the listing tune-up system 132 to provide the users with different recommendations according to their experience levels. For example, an inexperienced user (e.g., seller) may not know that the item listing 114 of the recommended category set draws more user attentions or activities (e.g., viewing, bidding or buying, etc.) when highlighted (e.g., colored, underlined, flowing or written in a larger font, etc.) or combined with a relevant picture. In contrast, an experience user may be likely to know such tips from their transaction experiences. By using the value indicating the experience level of the user, the generating module 270 may include different recommendations in the tune-up report 136.

The listing tune-up system 132 may further comprise a communication module 290 to transmit the tune-up report 136 to a computer system (e.g., user device 110-1) associated with the user. In one example embodiment, the communication module 290 may further detect a user selection 272 of one or more recommendations from the tune-up report. The listing tune-up system 132 may then modify an associated listing (e.g., item listing 114) according to the detected user selection 272. In other words, for example, the tune-up system 132 may modify the category, or highlight the title for the item listing 114 based on the user selection 272 of the recommendation included in the tune-up report 136. When the item listing 114 is modified, the communication module 290 may keep track of the modification and/or a number of recommendations in the tune-up report in response to which the item listing 114 is modified. In one example embodiment, the tracked information (e.g., the number of recommendations in response to which the item listing 114 is modified) may be used to bill the user who listed the item listing 114 accordingly. In one example embodiment, the online transaction platform system 134 may be used to actually modify the item listing 114 according to the detected user selection 272 and bill the user (e.g., seller) according to the modification. In one example embodiment, the listing tune-up system 132 may further include a modifying module 292 to performing and tracking the modification of a plurality of item listings including the item listing 114. Although illustrated as being included in the communication module 290, the modifying module 292 may be implemented as a separate module of the listing tune-up system 132.

It is noted that each of the engines described above in FIG. 2 may be implemented by hardware (e.g., circuit), firmware, software or any combinations thereof. It is also noted that although each of the modules is described above as a separate module, the entire modules or some of the modules in FIG. 2 may be implemented as a single entity (e.g., module or circuit) and still maintain the same functionality. Example operations performed by the listing tune-up system 132 are discussed with reference to FIG. 3.

Figure 3:
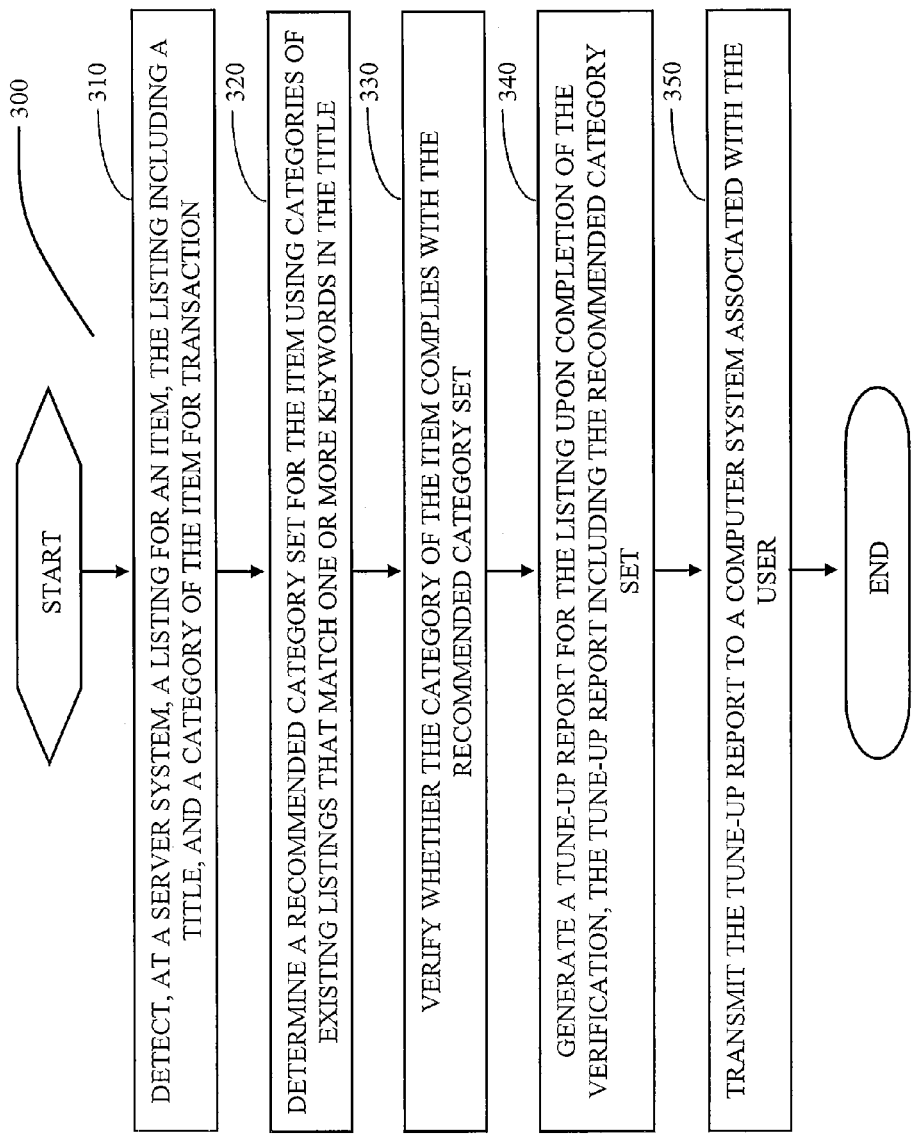
FIG. 3 is a flow chart of a method for using a listing tune-up system, in accordance with an example embodiment.

FIG. 3 is a flow chart illustrating a method 300 for operating the listing tune-up system 132, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides in various modules illustrated in FIG. 1 and FIG. 2. It should be noted that the activities described herein may be executed in an order other than the order described. The various activities described with respect to the methods identified herein may also be executed in repetitive, serial, and/or parallel fashion.

As shown in FIG. 3, at operation 310, the listing tune-up system 132 may detect, at a server system (e.g., the host device 130), a listing for an item (e.g., item listing 114). The listing for the item may include at least one title, and at least one category of the item for transaction. At operation 320, the listing tune-up system 132 may determine a recommended category set for the item using categories of existing listings that match one or more keywords in the title of the listing. In one example embodiment, the listing tune-up system 132 may calculate a usage frequency of a category included in each matching existing listing relative to a total number of the existing listings. For example, in order to calculate the usage frequency of the category for matching existing listings, the listing tune-p system 132 may parse the title and extract the one or more keywords from the title, compose a query based upon the one or more keywords, access a listing database (DB) using the query, retrieve from the listing DB the existing listings that meet the query, and extract the categories of the existing listings to calculate corresponding usage frequencies. In one example embodiment, the listing tune-up system 132 may further sort categories for the existing listings according to their corresponding usage frequencies and then designate a category with a highest usage frequency and a second highest usage frequency as a first recommended category and a second recommended category for the item, respectively.

At operation 330, the listing tune-up system 132 may verify whether the category of the item complies with the recommended category set. At operation 340, when the verification of the category is completed, the listing tune-up system 132 may generate a tune-up report 136 that includes the recommended category set. In one example embodiment, the tune-up report 136 may further comprise an additional recommendation, such as an editing suggestion, a payment method suggestion or a picture suggestion for the listing. In one example embodiment, the generating of the tune-up report for the listing upon completion of the verification may include optimizing the tune-up report according to an attribute value indicating an experience level of a user. In such a case, the optimizing of the tune-up report may include automatically determining the experience level of the user using a number of previous transactions by the user.

At operation 350, the listing tune-up system 132 may transmit the tune-up report 136 to a computer system associated with the user (e.g., user device 110-1) from which the item listing is listed. In one example embodiment, the listing tune-up system 132 may detect a user selection of a recommendation in the tune-up report 136 transmitted to the computer system associated with the user (e.g., user device 110-1). In one example embodiment, the listing tune-up system 132 may modify the listing in response to the user selection of the recommendation in the transmitted tune-up report. In one example embodiment, the listing tune-up system 132 may further keep track of a number of recommendations in the transmitted tune-up report 136 in response to which the listing is modified. The listing tune-up system 132 may bill the user according to the tracked information.

As an illustration, the item listing 114 may be listed by a user (e.g., seller) via his or her user device (e.g., 110-1) to the online transaction platform system 134 with a user-provided information, such as "Persian carpet" in its title and "rug" in its category, respectively. The listing tune-up system 132 (e.g., the detecting module 210) then may detect that the item listing 114 is newly listed to the online transaction platform system 134 before the online transaction platform system 134 publishes the item listing 114 to other users. The listing tune-up system 132 (e.g., the determining module 230) may then search existing item listings (e.g., one hundred listings) that include the term "Persian carpet" in their titles and determine multiple categories (e.g., "antiques" for sixty times, "home decoration" for forty times and "rug" for fifteen times, etc.) are used for items similar to or the same as the item ("Persian carpet"). When the usage frequencies of categories used for the matching existing listings are verified to be in the order of "antiques" (sixty percent), "home decoration" (forty percent) and "rug" (fifteen percent), the listing tune-up system 132 (e.g., the generating module 270) may then generate a tune-up report 136 that includes the most frequently used categories ("antiques" and "home decoration") as a recommended category set for the item listing 114. The user (e.g., seller) may then decide whether to accept the recommended category set as new category information for the item listing 114. Then the listing tune-up system 132 may further modify the item listing 114 according to the user's selection and bill the user according to the modification.

It is noted that the item listing 114 may be listed without any user-designated category information in one example embodiment. In such a case, once the item listing 114 is detected, for example, by the detecting module 210, the listing tune-up system 132 (e.g., the determining module 230) may determine the most frequently used categories (e.g., "antiques" and "home decoration") as the recommended category set for the item (e.g., "Persian carpet"). The listing tune-up system 132 (e.g., the determining module 230) may then automatically designate one or more of the most frequently used categories as system-provided categories for the item without recommending the most frequently used categories to the user first. In one example embodiment, the listing tune-up system 132 (e.g., the generating module 270) may still generate the tune-up report 136 and recommend the most frequently used categories to the user via the tune-up report 136 instead of automatically designating any of them as system-provided categories. In such a case, the listing tune-up system 132 (e.g., the communication module 290) or the online transaction platform system 134 may then request the user to select at least one of the recommended categories before the item listing 114 can be published to other users for further transaction.

The listing tune-up system 132 and its method of operations allow, among other things, a listing for an item (e.g., the item listing 114) to more correctly reflect proper category of the item based upon statistical information over one or more existing listings before it is viewed to other users for an intended transaction. This in turn allows the listing to get exposed to potential buyers more frequently and thus receive more user activities (e.g., viewing, bidding or buying, etc.), ultimately increasing the probability of the item associated with the listing being transacted in a much shorter period of time and/or at more satisfactory price.

Example Database

Some example embodiments may include various databases (e.g., the listing database 140) being relational databases or in some example cases On Line Analytic Processing (OLAP)-based databases. In the case of relational databases, various tables of data are created and data is inserted into, and/or selected from, these tables using SQL or some other database-query language known in the art. In the case of OLAP databases, one or more multi-dimensional cubes or hypercubes containing multidimensional data from which data is selected or into which data is inserted using Multidimensional Expressions (MDX) may be implemented. In the case of a database using tables and SQL, a database application such as, for example, MySQL™, SQLServer™, Oracle 8I™, 10G™, or some other suitable database application may be used to manage the data. Here, the case of a database using cubes and MDX, a database using Multidimensional On Line Analytic Processing (MOLAP), Relational On Line Analytic Processing (ROLAP), Hybrid On Line Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, optimization algorithm known in the art.

A Three-Tier Architecture

In some example embodiments, a method is illustrated as implemented in a distributed or non-distributed software application designed under a three-tier architecture paradigm, whereby the various components of computer code that implement this method may be categorized as belonging to one or more of these three tiers. Some example embodiments may include a first tier as an interface (e.g., an interface tier) that is relatively free from application processing. Further, a second tier may be a logic tier that performs application processing in the form of logical/mathematical manipulations of data inputted through the interface level, and that communicates the results of these logical/mathematical manipulations to the interface tier and/or to a backend or storage tier. These logical/mathematical manipulations may relate to certain business rules or processes that govern the software application as a whole. A third storage tier may be a persistent storage medium or non-persistent storage medium. In some example cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as may be discussed below, a variety of technologies. This three-tier architecture, and the technologies through which it is implemented, may be executed on two or more computer systems organized in a server-client, peer-to-peer, or some other suitable configuration. Further, these three tiers may be distributed between more than one computer system as various software components.

Component Design

Some example embodiments may include the above illustrated tiers and the processes or operations that make them up, as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component-oriented or object-oriented programming technique can be implemented using a Visual Component Library (VCL), Component Library for Cross Platform (CLX), JavaBeans (JB), Enterprise JavaBeans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls used to implement one or more of the above-illustrated components across a distributed programming environment as distributed computing components. For example, an interface component (e.g., an interface tier) may reside on a first computer system remotely located from a second computer system containing a logic component (e.g., a logic tier). These first and second computer systems may be configured in a server-client, peer-to-peer, or some other suitable configuration. These various components may be written using the above-illustrated object-oriented programming techniques, and can be written in the same programming language or a different programming language. Various protocols may be implemented to enable these various components to communicate regardless of the programming language used to write these components. For example, a component written in C++ may be able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some example embodiments may use the OSI model or TCP/IP protocol stack model for defining the protocols used by a network to transmit data. In applying these models, a system of data transmission between a server and client or between peer computer systems is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as the Internet, a Local Area Network (LAN), a Wide Area Network (WAN), or some other suitable network. In some example cases, "Internet" refers to a network of networks. These networks may use a variety of protocols for the exchange of data, including the aforementioned TCP/IP, and additionally Asynchronous Transfer Mode (ATM), Systems Network Architecture (SNA), or some other suitable protocol. These networks may be organized within a variety of topologies (e.g., a star topology) or structures.

A Computer System

Figure 4:
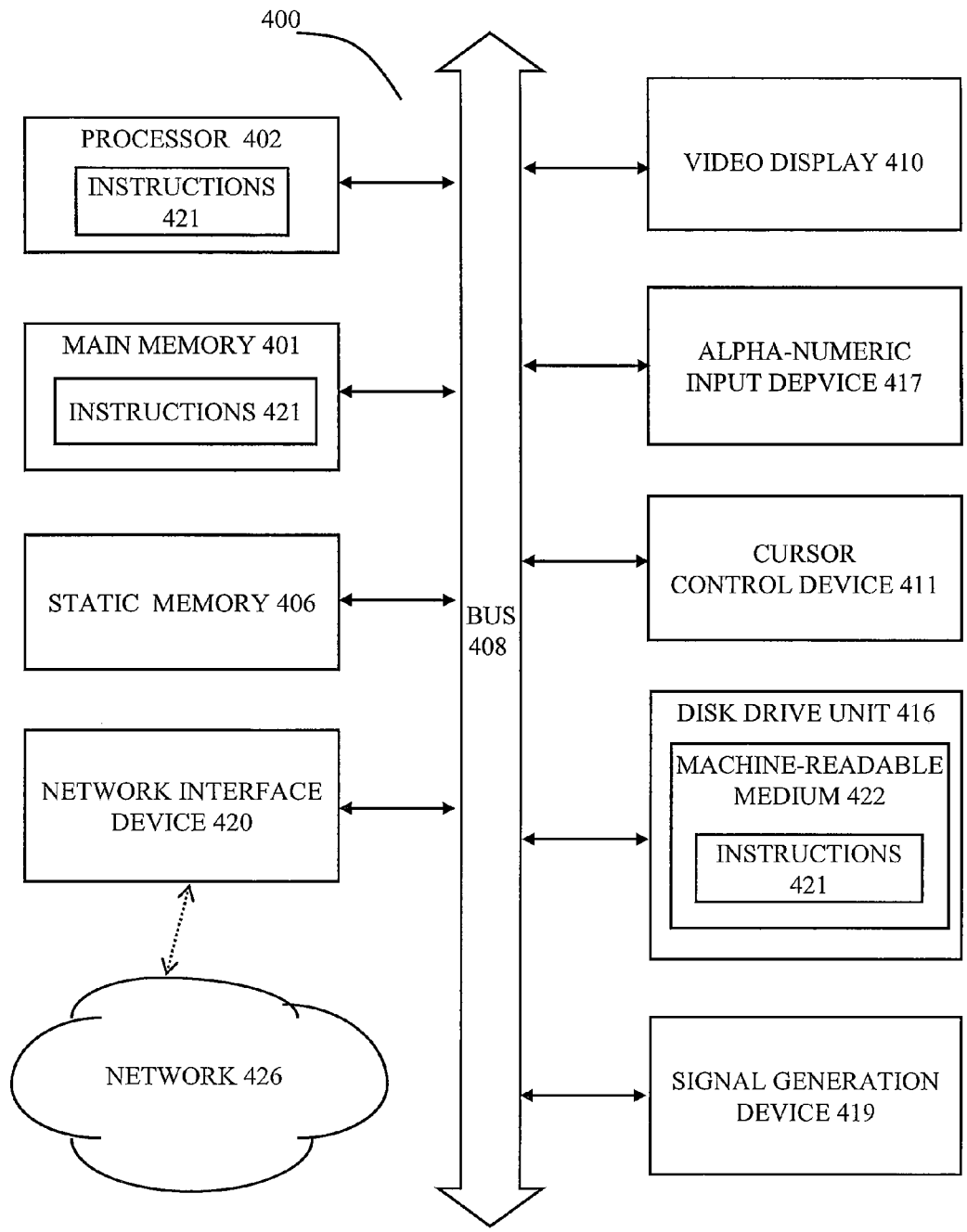
FIG. 4 is a diagrammatic representation of an example machine in the form of a computer system within which a set of instructions, for causing the machine to perform any one or more of the methodologies discussed herein, may be executed.

FIG. 4 shows a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 401 and a static memory 406, which communicate with each other via a bus 408. The computer system 400 may further include a video display unit 410 (e.g., a liquid crystal display (LCD) or a cathode ray tube (CRT), etc.). The computer system 400 also includes an alpha-numeric input device 417 (e.g., a keyboard), a user interface (UI) navigation device (e.g., a cursor control device 411), a disk drive unit 416, a signal generation device 419 (e.g., a speaker) and a network interface device 420. The disk drive unit 416 includes a machine-readable medium 422 on which is stored one or more sets of instructions 421 and data structures (e.g., software) embodying or utilized by any one or more of the methodologies or functions described herein. The instructions 421 and data structures may also reside, completely or at least partially, within the main memory 401 and/or within the processor 402 during execution thereof by the computer system 400, with the main memory 401 and the processor 402 also constituting machine-readable media. The instructions 421 and data structures may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Marketplace Applications

In some example embodiments, a system and method are illustrated to tune up a listing for an item. The system and method may include detecting, at a server system, a listing for an item. The listing may comprise various information including a title, and a category of the item for transaction. The system and method may include determining a recommended category set for the item using categories of existing listings that match one or more keywords in the title. The system and method may include verifying whether the category of the item complies with the recommended category set. The system and method may further include generating a tune-up report for the listing upon completion of the verification. The tune-up report may comprise the recommended category set and/or other editing suggestions.

Additional Notes

The above "DETAILED DESCRIPTION" includes references to the accompanying drawings, which form a part of the "DETAILED DESCRIPTION." The drawings show, by way of illustration, specific embodiments of the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Example Embodiments, with each claim standing on its own as a separate embodiment.

What is claimed is:

1. A computer-implemented system comprising:
   at least one processor to run a detecting module configured to detect a listing for an item, the listing including a title, and a category of the item for transaction;
   a determining module to determine a recommended category set for the item using categories of existing listings that match one or more keywords in the title;

a verifying module to verify whether the category of the item complies with the recommended category set; and a generating module to generate a tune-up report for the listing upon completion of the verification, the tune-up report including the recommended category set and a recommendation comprising at least one tip regarding highlighting one or more keywords of the listing, the generating module configured to determine an attribute value indicative of an experience level of a user who listed the listing based on a number of previous transactions by the user and to optimize the tune-up report according to the attribute value, wherein the generating module is configured to calculate a fee for the tune-up report based on a number of categories of the recommended category set accepted by the user.

2. The computer-implemented system of claim 1, wherein the determining module is to calculate a usage frequency of a category included in each existing listing relative to a total number of the existing listings.

3. The computer-implemented system of claim 2, wherein the determining module is to:
   parse the title and extract the one or more keywords from the title;
   compose a query based upon the one or more keywords;
   access a listing database (DB) using the query;
   retrieve from the listing DB the existing listings that meet the query; and
   extract the categories of the existing listings to calculate corresponding usage frequencies.

4. The computer-implemented system of claim 2, wherein the determining module is to:
   sort the categories for the existing listings according to the corresponding usage frequencies of the categories; and
   designate a category with the highest usage frequency from the categories for the existing listings and a category with the second highest usage frequency from the categories for the existing listings as a first recommended category for the item and a second recommended category for the item, respectively.

5. The computer-implemented system of claim 1, wherein the generating module includes an optimizing module to optimize the tune-up report.

6. The computer-implemented system of claim 1, further comprising a communication module to transmit the tune-up report to a computer system associated with the user who listed the listing.

7. The computer-implemented system of claim 6, wherein the communication module is to detect a user selection of a recommendation in the tune-up report.

8. The computer-implemented system of claim 7, wherein the communication module includes a modifying module to modify the listing in response to the user selection of the recommendation detected in the tune-up report.

9. The computer-implemented system of claim 8, wherein the modifying module is to determine a number of recommendations in the tune-up report in response to which the listing is modified.

10. A computer-implemented method comprising:
   detecting, at a server system, a listing for an item, the listing including a title, and a category of the item for transaction;
   determining a recommended category set for the item using categories of existing listings that match one or more keywords in the title;
   verifying whether the category of the item complies with the recommended category set; and
   generating a tune-up report for the listing upon completion of the verification, the tune-up report including the recommended category set and a recommendation comprising at least one tip regarding highlighting one or more keywords of the listing, the generating including determining an attribute value indicative of an experience level of a user who listed the listing based on a number of previous transactions by the user, the generating including optimizing the tune-up report according to the attribute value, and the generating including calculating a fee for the tune-up report based on a number of categories of the recommended category set accepted by the user.

11. The computer-implemented method of claim 10, wherein the determining of the recommended category set for the item using categories of existing listings comprises calculating a usage frequency of a category included in each existing listing relative to a total number of the existing listings.

12. The computer-implemented method of claim 11, wherein the calculating of the usage frequency of the category included in each existing listing relative to the total number of the existing listings comprises:
   parsing the title and extracting the one or more keywords from the title;
   composing a query based upon the one or more keywords;
   accessing a listing database (DB) using the query;
   retrieving the existing listings from the listing DB that meet the query; and
   extracting the categories of the existing listings.

13. The computer-implemented method of claim 11, wherein the determining of the recommended category set for the item using categories of existing listings further comprises:
   sorting the categories for the existing listings according to the corresponding usage frequencies of the categories; and
   designating a category with the highest usage frequency from the categories for the existing listings and the second highest usage frequency from the categories for the existing listings as a first recommended category and a second recommended category for the item, respectively.

14. The computer-implemented method of claim 10, further comprising transmitting the tune-up report to a computer system associated with the user who listed the listing to the server system.

15. The computer-implemented method of claim 14, further comprising detecting a user selection of a recommendation in the tune-up report transmitted to the computer system associated with the user.

16. The computer-implemented method of claim 15, further comprising modifying the listing in response to the user selection of the recommendation in the transmitted tune-up report.

17. A non-transitory computer-readable storage device storing instructions, wherein the instructions, when executed by a processor, cause the processor to perform operations comprising:
   detecting, at a server system, a listing for an item, the listing including a title, and a category of the item for transaction;
   determining a recommended category set for the item using categories of existing listings that match one or more keywords in the title;
   verifying whether the category of the item complies with the recommended category set; and generating a tune-up report for the listing upon completion of the verification, the tune-up report including the recommended category set and a recommendation comprising at least one tip regarding highlighting one or more keywords of the listing, the generating including determining an attribute value indicative of an experience level of a user who listed the listing based on a number of previous transactions by the user, the generating including optimizing the tune-up report according to the attribute value, and the generating including calculating a fee for the tune-up report based on a number of categories of the recommended category set accepted by the user.

18. The computer-implemented system of claim 1, wherein the generating module is configured to add a recommendation associated with the listing in the tune-up report based on a determination that the number of previous transactions does not exceed a threshold value and wherein the generation module is configured to refrain from adding the recommendation in the tune-up report based on a determination that the number of previous transactions exceeds the threshold value.

19. The computer-implemented system of claim 1, wherein the generating module is configured to add a recommendation comprising at least one tip regarding using a relevant picture for the listing.

* * * * *